(12) United States Patent
Nielson

(10) Patent No.: US 7,584,548 B2
(45) Date of Patent: Sep. 8, 2009

(54) TAPE MEASURE

(76) Inventor: Rob Nielson, 640 Queens Road East, North Vancouver, British Columbia (CA) V7N 1H3

(*) Notice: Subject to any disclaimer, the term of this patent is extended or adjusted under 35 U.S.C. 154(b) by 272 days.

(21) Appl. No.: 11/653,299

(22) Filed: Jan. 16, 2007

(65) Prior Publication Data

US 2008/0168674 A1 Jul. 17, 2008

(51) Int. Cl.
*G01B 3/10* (2006.01)
(52) U.S. Cl. .............................. 33/765; 33/755; 33/760; 33/761; D10/72
(58) Field of Classification Search ........... 33/755–771; D10/72
See application file for complete search history.

(56) References Cited

U.S. PATENT DOCUMENTS

| D98,554 | S | * | 2/1936 | Stowell ..................... D10/74 |
| 2,867,187 | A | * | 1/1959 | Huggins ..................... 116/313 |
| 3,164,907 | A | | 1/1965 | Quenot |
| 3,205,584 | A | | 9/1965 | Overaa |
| 3,214,836 | A | | 11/1965 | West |
| 3,494,038 | A | | 2/1970 | Quenot |
| 3,716,201 | A | | 2/1973 | West |
| 4,142,693 | A | | 3/1979 | Czerwinski |
| 4,462,160 | A | | 7/1984 | Cohen et al. |
| 4,516,325 | A | | 5/1985 | Cohen et al. |
| 4,547,969 | A | * | 10/1985 | Haack ..................... 33/760 |
| 4,977,684 | A | | 12/1990 | Mosman |
| 5,544,420 | A | | 8/1996 | Choi |
| 5,829,152 | A | * | 11/1998 | Potter et al. ..................... 33/668 |
| 6,030,091 | A | | 2/2000 | Li |
| 6,094,833 | A | * | 8/2000 | Medley, Jr. ..................... 33/770 |
| D433,344 | S | * | 11/2000 | Hsu ..................... D10/72 |
| 6,178,655 | B1 | * | 1/2001 | Potter et al. ..................... 33/668 |
| 6,434,854 | B1 | | 8/2002 | MacColl et al. |
| 6,598,311 | B2 | | 7/2003 | Noon |
| 6,877,245 | B2 | | 4/2005 | Brohammer |
| 6,892,469 | B2 | * | 5/2005 | Tufts et al. ..................... 33/768 |
| 6,918,191 | B2 | | 7/2005 | Stauffer et al. |
| 7,065,895 | B2 | * | 6/2006 | Hoopengarner ..................... 33/760 |
| 7,234,246 | B1 | * | 6/2007 | Rhead ..................... 33/755 |
| 7,353,619 | B2 | * | 4/2008 | Gibbons et al. ..................... 33/761 |

FOREIGN PATENT DOCUMENTS

JP 2006-275675 A2 10/2006

* cited by examiner

*Primary Examiner*—G. Bradley Bennett
*Assistant Examiner*—Tania C Courson
(74) *Attorney, Agent, or Firm*—Cameron IP

(57) ABSTRACT

A tape measure comprises a housing having a tape outlet opening. A flexible measuring tape is movable between a retracted position in which the measuring tape is substantially disposed within the housing, and an extended position in which at least a portion of the measuring tape extends through the tape outlet opening and linearly outside the housing. The measuring tape has a free end and a pair of longitudinal edges, and the measuring tape has measuring indicia displayed thereon. A magnifying lens is connected to the housing. The magnifying lens overlays the portion of the measuring tape extending outside the housing when the measuring tape is in the extended position. The magnifying lens extends laterally beyond one of the longitudinal edges of the measuring tape. A cross-hair extends across the magnifying lens. The cross-hair is generally perpendicular to the longitudinal edges of the portion of the measuring tape extending outside the housing. The cross-hair is aligned against the measuring indicia.

23 Claims, 5 Drawing Sheets

TAPE MEASURE

BACKGROUND OF THE INVENTION

The present invention relates to a tape measure and, in particular, to an improved tape measure that allows a user to accurately measure internal dimensions and mark pre-determined distances.

Tape measures are generally used to measure either a distance between two fixed points or a pre-determined distance from a reference point. For example, prior to fitting a door, a tape measure may be used to measure the internal dimensions of the door opening, i.e. the distance between opposed doorjambs. During the fitting of the door, the tape measure may be used to measure a point of installation for a door latch, i.e. a fixed distance from the bottom of the door. It is important that the internal dimensions of the door opening are measured accurately, as otherwise the manufactured door will not fit correctly in the door opening. It is also important that the point of installation for the door latch is measured accurately, as otherwise the door latch will not properly engage the door strike plate when the door is installed.

Unfortunately, there are numerous factors that may affect a user's ability to accurately measure internal dimensions and mark distances with a conventional tape measure. A conventional tape measure is typically only provided with scales graduated to $\frac{1}{16}$th of an inch, which is about the finest graduation that can be comfortably distinguished by a human eye. This restricts the accuracy of the measurements to $\frac{1}{16}$th of an inch even in applications that may require measurements to $\frac{1}{32}$nd or even $\frac{1}{64}$th of an inch. It is also difficult to accurately measure internal dimensions with a conventional tape measure. A conventional tape measure housing requires that the measure tape be folded against a corner, thereby preventing a user from obtaining an accurate measurement of the internal dimension. Finally, it is often necessary to measure dimensions and mark distances in dimly lit environments where it is difficult for a user to read the scale.

To overcome the above-mentioned shortcomings, numerous improvements have been made to conventional tape measures. In U.S. Pat. No. 3,205,584 to Over a tape measure is provided with a magnifying lens to allow for more finely graduated scales. In U.S. Pat. No. 6,918,191 to Stauffer et al., a tape measure is provided with mounted rear tail to allow for measurement of internal dimensions. In U.S. Pat. No. 6,030,091 to Li a tape measure is provided with built-in light source to allow for use of the tape measure in dimly lit environments. All of the aforementioned references are incorporated herein by reference.

Although the above-mentioned improvements to conventional tape measures increase the accuracy with which the scale may be read, they do not provide means for accurately measuring dimensions and marking distances. The prior art improvements to conventional tape measures only improve the readability of the scale as a whole. Human error still occurs when a user determines which of the indicia on a scale defines the dimension or distance being measured. This may result in inaccurate measurements being obtained which in turn may lead to improperly fitting materials as discussed earlier. There is therefore a need for an improved tape measure that may be used to accurately measure dimensions and mark distances.

SUMMARY OF THE INVENTION

According to a first aspect of the present invention there is provided a tape measure comprising a housing having a tape outlet opening. A flexible measuring tape is movable between a retracted position in which the measuring tape is substantially disposed within the housing, and an extended position in which at least a portion of the measuring tape extends through the tape outlet opening and extends linearly outside the housing. The measuring tape has a free end and a pair of longitudinal edges, and the measuring tape has measuring indicia displayed thereon. A magnifying lens is connected to the housing. The magnifying lens overlays the portion of the measuring tape extending outside the housing when the measuring tape is in the extended position. The magnifying lens extends laterally beyond one of the longitudinal edges of the measuring tape. A line extends across the magnifying lens. The line is generally perpendicular to the longitudinal edges of the portion of the measuring tape extending outside the housing. The line is aligned with the measuring indicia.

According to a second aspect of the present invention there is provided a tape measure comprising a housing having a tape outlet opening. A flexible measuring tape is movable between a retracted position in which the measuring tape is substantially disposed within the housing, and an extended position in which at least a portion of the measuring tape extends through the tape outlet opening and extends linearly outside the housing. The measuring tape has a free end and a pair of longitudinal edges, and the measuring tape has measuring indicia displayed thereon. A magnifying lens is connected to the housing. The magnifying lens overlays the portion of the measuring tape extending outside the housing when the measuring tape is in the extended position. The magnifying lens extends laterally beyond one of the longitudinal edges of the measuring tape. A line extends across the magnifying lens. The line is generally perpendicular to the longitudinal edges of the portion of the measuring tape extending outside the housing. The line is aligned with the measuring indicia. There is an elongate member connected to the housing. The elongate member has free end remote from the housing. There is a known longitudinal distance between the line and the free end of the elongate member.

According to a third aspect of the present invention there is provided a tape measure comprising a housing having a tape outlet opening. A flexible measuring tape is movable between a retracted position in which the measuring tape is substantially disposed within the housing, and an extended position in which at least a portion of the measuring tape extends through the tape outlet opening and extends linearly outside the housing. The measuring tape has a free end and a pair of longitudinal edges, and the measuring tape has measuring indicia displayed thereon. A magnifying lens is connected to the housing. The magnifying lens overlays the portion of the measuring tape extending outside the housing when the measuring tape is in the extended position. The magnifying lens extends laterally beyond one of the longitudinal edges of the portion of the measuring tape. There is a line extending across the magnifying lens. The line is perpendicular to the longitudinal edge of the portion of the measuring tape extending outside of the housing. The line is aligned with the measuring indicia. There is an elongate member connected to the housing. The elongate member has a free end remote from the housing. The measuring indicia aligned with the line correspond to a longitudinal distance between the free end of the measuring tape and the free end of the elongate member.

The tape measure may include a linear edge at a periphery of the magnifying lens. The linear edge may be perpendicular to the cross-hair. The tape measure may also include a light source positioned to illuminate the magnifying lens. The housing may have a generally plano-concave longitudinal profile.

BRIEF DESCRIPTION OF THE DRAWINGS

Referring to the drawings.

DETAILED DESCRIPTION OF THE PREFERRED EMBODIMENT

Figure 1:
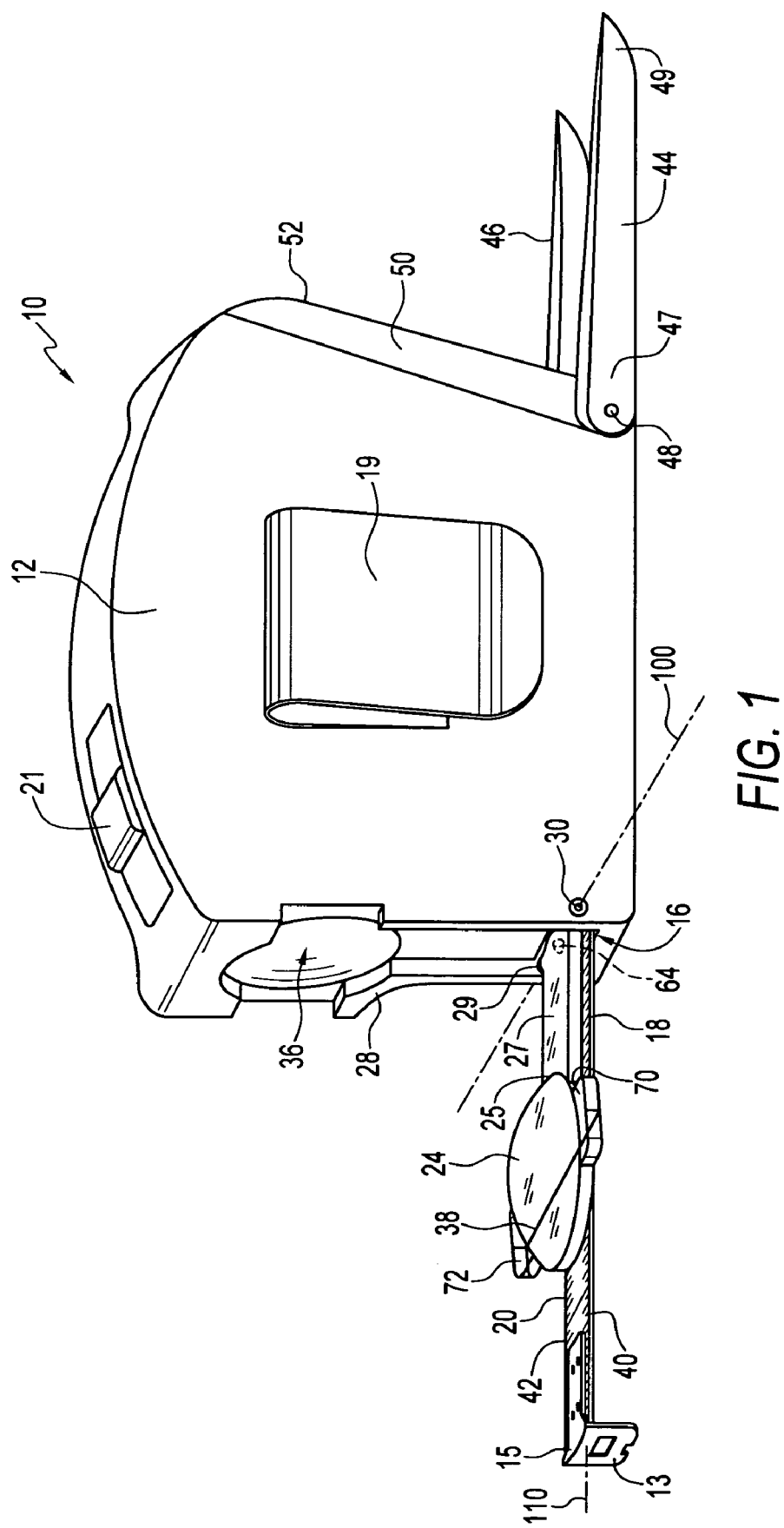
FIG. 1 is an isometric side view of a tape measure, according to an embodiment of the invention, showing a measuring tape in an extended position.
Figure 2:
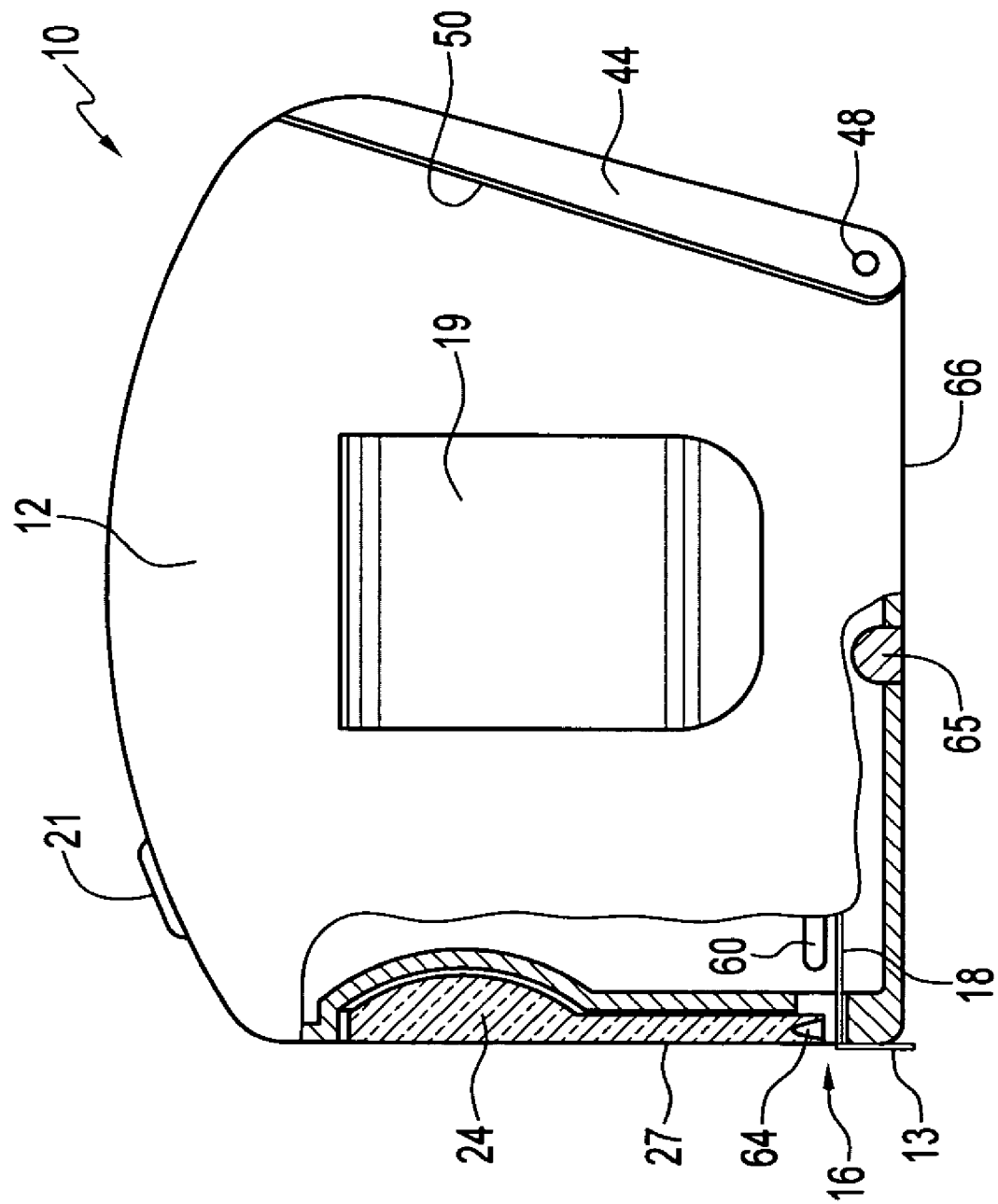
FIG. 2 is a elevational, partly broken, side view of the tape measure of FIG. 1 showing the measuring tape in a retracted position.

Referring to the drawings and first to FIG. 1, a tape measure 10 is shown according to an embodiment of the present invention. The tape measure 10 includes a housing 12 which encloses a flexible measuring tape 18. The housing 12 has a generally plano-concave longitudinal profile, best shown in FIG. 4, which allows a user to easily grip the tape measure 10. There is a clip 19 disposed on a plane side of housing 12. The clip 19 allows a user to attach the tape measure 10 to a belt or the like. This facilitates transport of the tape measure 10. There is also a tape outlet opening 16 at a first end 28 of the housing 12. The measuring tape 18 has a hook 13 at a free end thereof. The hook 13 extends perpendicularly from the measuring tape 18. The hook 13 allows the measuring tape 18 to be hooked onto an object being measured. A corner edge 15 of the hook 13 corresponds with a zero line of a scale provided on the measuring tape 18. The hook 13 also prevents the free end of the measuring tape 18 from retracting into the housing 12 beyond a desired point as best shown in FIG. 2.

The measuring tape 18 is movable between an extended position and a retracted position. In the extended position, shown in FIG. 1, at least a portion of the measuring tape 18 extends through the tape outlet opening 16 and extends linearly outside the housing 12. The portion of the measuring tape 18 extending through the tape outlet opening 16 and linearly outside the housing 12 may be referred to as the extended portion 20 of the measuring tape 18. In the retracted position, shown in FIG. 2, the measuring tape 18 is substantially disposed within the housing 12. Components which enable movement of the measuring tape 18 between the extended position and retracted position, and which enable locking of the measuring tape 18 in the extended position, function in a substantially similar manner as similar components disclosed in the prior art. These components are therefore not described in detail herein. However, a locking mechanism actuator 21 in the form of a press strip is shown in FIGS. 1 to 4.

As shown in FIG. 1, a magnifying lens 24 is movably connected to the first end 28 the housing 12 by an elongate member 27. In this example, the magnifying lens 24 is formed from a clear resin bubble and is shown in greater detail in FIG. 5. Referring back to FIG. 1, the magnifying lens 24 is connected to a first end 25 of the elongate member 27. The second end 29 of the elongate member 27 is pivotably connected to the housing 12 by a pin 30. The magnifying lens 24 is pivotable about a pivot axis 100. Although, in this example, the magnifying lens 24 is pivotably connected to the housing 12, it will be understood by a person skilled in the art that in another embodiment of the invention the magnifying lens may be connected to the housing by other means. For example, the magnifying lens may be slidably mounted within the housing such that the magnifying lens is slidably movable from a recessed position within the housing to an extended position outside the housing. Alternatively, in still another embodiment of the invention, the magnifying lens may be fixedly mounted to the housing.

Figure 3:
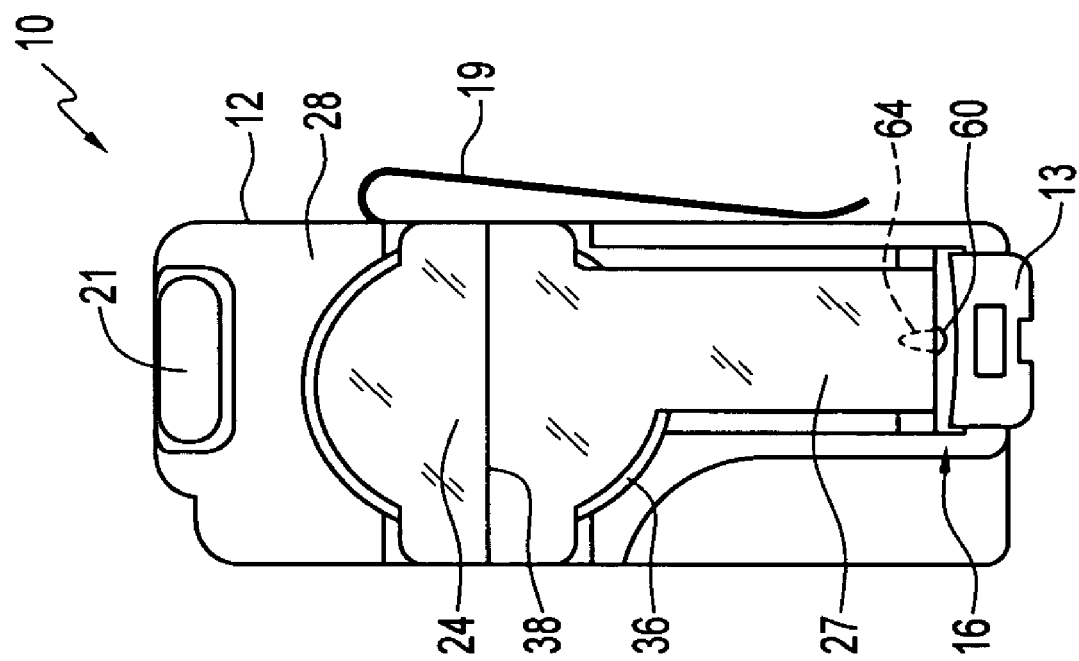
FIG. 3 is an elevational front end view of the tape measure of FIG. 1.
Figure 4:
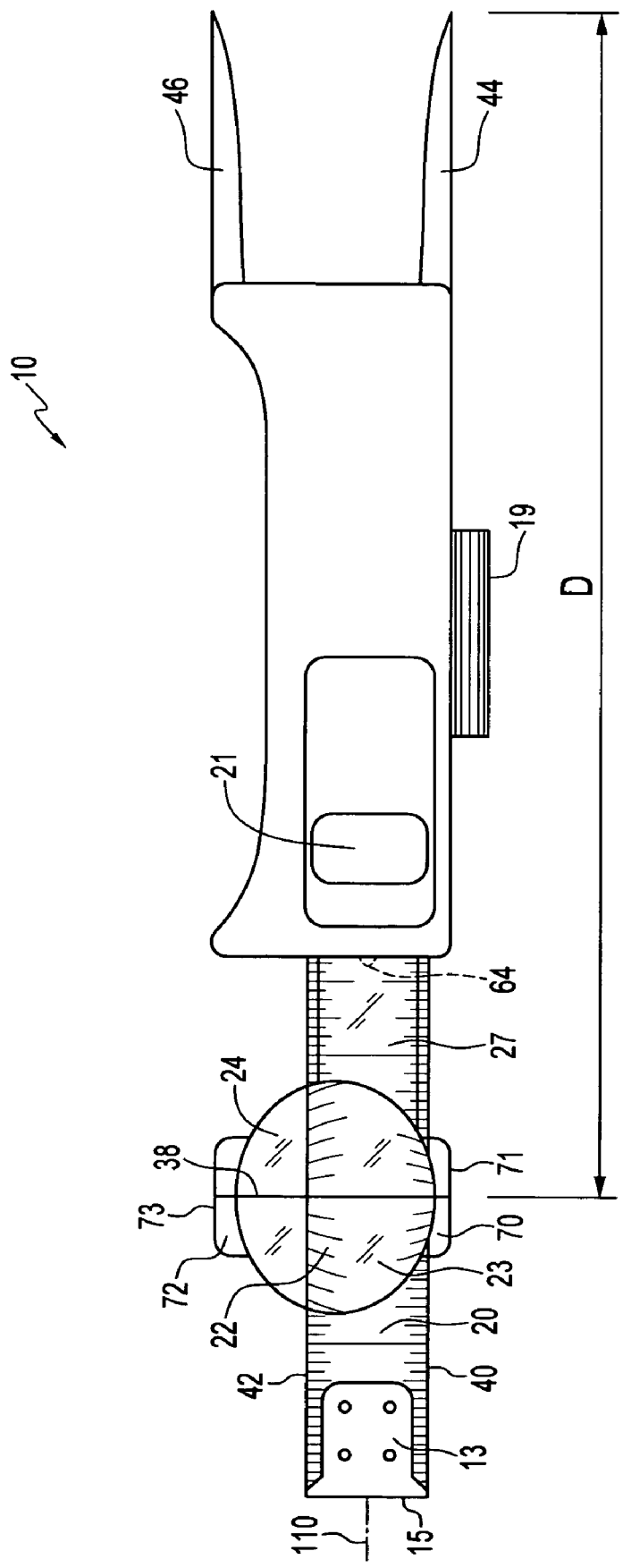
FIG. 4 is an elevational top view of the tape measure of FIG. 1.

There is a recess 36 disposed in the first end 28 of the housing 12. The recess 36 is configured to receive the magnifying lens 24, as shown in FIGS. 2 and 3. This allows for compact storage of the tape measure 10. The magnifying lens 24 is pivotable about the pivot axis 100, shown in FIG. 1, between a position in which the magnifying lens 24 overlays the extended portion 20 of the measuring tape 18, as shown in FIGS. 1 and 4, and a position in which the magnifying lens 24 is disposed within the recess 26, as shown in FIGS. 2 and 3. As shown in FIG. 1, the pivot axis 100 is generally perpendicular to a longitudinal axis 110 of the extended portion 20 of the measuring tape 18.

Referring now to FIG. 4, when the magnifying lens 24 overlays the extended portion 20 of the measuring tape 18, first and second sets linear measuring indicia 22 and 23 displayed on the extended portion 20 of the measuring tape 18 are magnified. This allows for a more finely graduated scale to be provided on the measuring tape 18. A prior art tape measure typically only provides measuring indicia in increments that can be comfortably distinguished by a human eye, for example, in increments of $\frac{1}{16}$th of an inch. The present invention allows for more precise measuring indicia, for example, in increments of $\frac{1}{128}$th of an inch. The present invention therefore provides the advantage of increased measuring precision over prior art tape measures.

Alternatively, in a second embodiment, the measuring tape of the present invention may be provided with measuring indicia in increments that can be comfortably distinguished by a human eye without the use of a magnifying lens, for example, in increments of $\frac{1}{16}$th of an inch. In this second embodiment of the invention, the purpose of the magnifying lens is to allow a user to read the measuring indicia when the tape measure is held away from the eyes by an outstretched arm, or the like, as is common practice in carpentry and construction. This second embodiment of the invention also has the added advantage that it may be used by a visually impaired user. It will be understood by a person skilled in the art that increments of $\frac{1}{16}$th of an inch and $\frac{1}{128}$th are provided herein by way of example only and that alternate measurements may be used as appropriate.

As best shown in FIG. 2, a light source 60 is disposed within the housing 12. The light source 60 emits light through the tape outlet opening 16. The light source 60 is not positioned to emit light directly downwardly and onto the measuring tape 18. Instead the light source 60 is positioned to emit light outwardly and through the elongate member 27 to the magnifying lens 24, thereby illuminating the magnifying lens 24. This provides the advantage of allowing a user to read the measuring indicia 22 and 23 on the extended portion 20 of the measuring tape 18 in dimly lit environments. Preferably the light source 60 is a light emitting diode, or LED, powered by a small battery (not shown) disposed within the housing 12. However, the light source may be a filament type bulb or other known light-producing device in an alternative embodiment of the invention. The light source 60 is operated by a switch 65, shown in FIG. 2, built into a bottom 66 of the housing 12. It will be understood by a person skilled in the art that although, in this example, the light source 60 is disposed within the housing 12, in other embodiments of the invention the light source may be disposed outside the housing, in the elongate member, or in the magnifying lens itself. For example, the light source may be disposed in a recess 64 of the elongate member 27, shown in FIGS. 1 to 5.

As shown in FIGS. 1 and 3 to 5, the magnifying lens 24 has a line in the form of a cross-hair 38. When the magnifying lens 24 overlays the extended portion 20 of the measuring tape 18, as best shown in FIG. 4, the cross-hair 38 is aligned with the measuring indicia 22. The magnifying lens 24 and the cross-hair 38 extend laterally beyond longitudinal edges 40 and 42 of the measuring tape 18. This allows for magnification of the material being measuring (not shown) and alignment of the cross-hair 38 with the material being measured. The present invention therefore allows a user to accurately measure and mark distances because the cross-hair may be accurately aligned with the material being measured at a desired location. The present invention also allows a user to accurately measure a distance between two fixed points because the cross-hair 38 may be accurately aligned against one of the fixed points and the corner edge 15 of the hook 13 may be aligned against the other fixed point. Human error associated with reading the scale is also minimized because the cross-hair is aligned with the appropriate measuring indicium.

Figure 5:
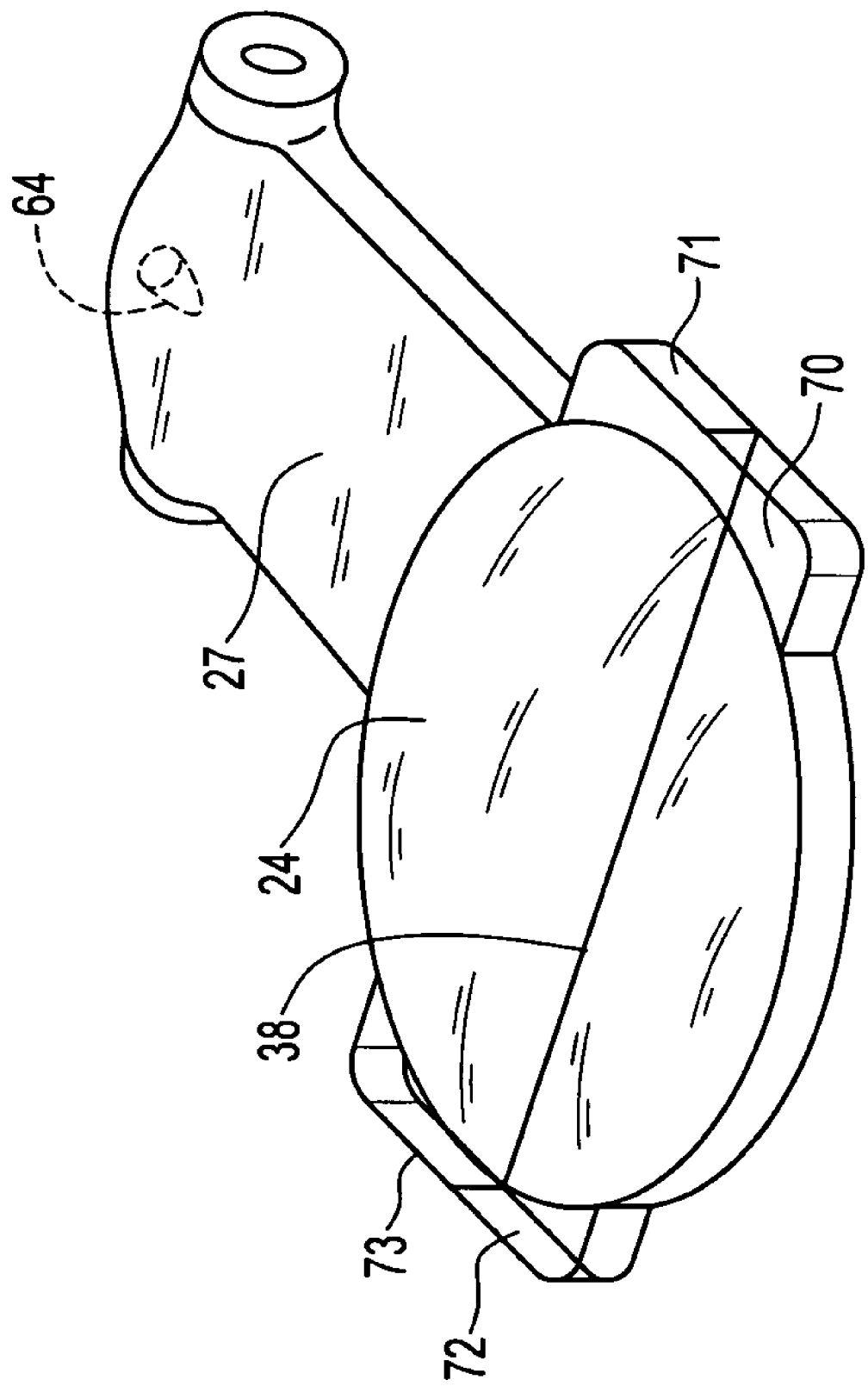
FIG. 5 is a isometric top view of a lens of the tape measure of FIG. 1.

There is a pair of opposite flanges 70 and 72 at a periphery of the magnifying lens 24, as best shown in FIG. 5. The flanges 70 and 72 extended laterally outward from and beyond respective ones of the longitudinal edges 40 and 42 of the measuring tape 18, as best shown in FIG. 4. Each of the flanges 70 and 72 has an outer edge 71 and 73, respectively, which is perpendicular to the cross-hair 38. The outer edges 71 and 73 facilitate marking of the material being measured by providing a level surface against which to mark.

A pair of elongate member 44 and 46, best shown in FIG. 1, are movably connected to the housing 12. In this example, the elongate members 44 and 46 are substantially alike and therefore only a first of the elongate members 44 is described in detail herein with understanding that a second elongate member 46 has a similar structure and function. The first elongate member 44 has a first end 47 and a second end 49. The first end 47 of the first elongate member 44 is pivotably connected to the housing 12 by a screw 48. The second free end 49 of the first elongate member 44 is remote from the housing 12. There is a recess 50 disposed at a second end 52 of the housing 12. The recess 50 is configured to receive the first elongate member 44, allowing for compact storage of the tape measure 10. The first elongate member 44 is movable between an extended position in which the first elongate member 44 is generally parallel to the extended portion 20 of the measuring tape 18, as shown in FIGS. 1 and 4, and a retracted position in which the first elongate member 44 is disposed within the recess 50, as shown in FIG. 2.

Although, in this example, the elongate members 44 and 46 are pivotably connected to the housing 12, it will be understood by a person skilled in the art that in another embodiment of the invention the elongate members may be movably connected to the housing by other means. For example, the elongate members may be slidably mounted within the housing such that the elongate members are slidably movable from a recessed position within the housing to an extended position outside the housing. Alternatively, in still another embodiment of the invention, the elongate members may be fixedly mounted to the housing.

The elongate members 44 and 46 allow the tape measure 10 of the present invention to be used to accurately measure internal dimensions such as the distance between a pair of opposed door jambs. In operation, at least one of the elongate members 44 and 46 is moved into the extended position. The corner edge 15 of the hook 13 is positioned to abut a first one of the door jambs. The measuring tape 18 is extended from the housing 12 until the free end of one of the elongate members 44 or 46 abuts against a second one of the door jambs. The magnifying lens 24 is then moved to overlay the elongate portion 20 of the measuring tape 18. A user may then determine the distance between the door jambs by summing the value of the measuring indica aligned with cross-hair, and a known value that is equal to the distance D between the cross-hair and the free end of the elongate member abutting the second door jamb, i.e. $D_{shown\ on\ tape} + D_{between\ cross\ hair\ and\ free\ end}$. In the embodiment of the invention shown in FIGS. 1 to 4, the distance between the cross-hair and the free end of the elongate member abutting against the second door jambs is 7 inches.

Alternatively, as shown in FIGS. 1 and 4, the measuring tape 18 may be provided with two sets of measuring indicia 22 and 23. The first set of measuring indicia 22 correspond to the actual distance from the corner edge 15 of the hook 13, as is standard in prior art tape measures. The second set of measuring indicia 23 incorporate the distance D between the cross-hair 38 and the free ends of the elongate members, as shown in FIG. 4. The second set of measuring indicia 23 correspond to the longitudinal distance between the corner edge 15 of the hook 13 and the free ends of the elongate members. An internal dimension can be quickly, accurately and directly obtained by reading the measuring indicium, on the second set of measuring indicia 23, that is aligned with the cross-hair 38. This eliminates the need for calculations and the occurrence of associated errors. Human error associated with reading the scale is also minimized.

It will be understood by someone skilled in the art that many of the details provided above are by way of example only and are not intended to limit the scope of the invention which is to be determined with reference to the following claims.

What is claimed is:

1. A tape measure comprising:
   a housing having a tape outlet opening;
   a flexible measuring tape movable between a retracted position in which the measuring tape is substantially disposed within the housing, and an extended position in which at least a portion of the measuring tape extends through the tape outlet opening and extends linearly outside the housing, the measuring tape having a free end and a pair of longitudinal edges, and the measuring tape having measuring indicia displayed thereon;
   a magnifying lens connected to the housing, the magnifying lens overlaying the portion of the measuring tape extending outside the housing when the measuring tape is in the extended position, and the magnifying lens extending laterally beyond one of the longitudinal edges of the measuring tape; and
   a line extending across the magnifying lens, the line being generally perpendicular to the longitudinal edges of the portion of the measuring tape extending outside the housing, the line being aligned with the measuring indicia.

2. The tape measure as claimed in claim 1 wherein the magnifying lens has a periphery and a linear edge at the periphery thereof, the linear edge being perpendicular to the line.

3. The tape measure as claimed in claim 1 further including a recess in the housing, the magnifying lens being movably connected to the housing, and the magnifying lens being movable to a position in which the magnifying lens is disposed in the recess.

4. The tape measure as claimed in claim 1 further including an elongate member connected to the housing, the elongate member having a free end remote from the housing.

5. The tape measure as claimed in claim 4 wherein there is a known longitudinal distance between the line and the free end of the elongate member.

6. The tape measure as claimed in claim 4 wherein the measuring indicia aligned with the line correspond to a longitudinal distance between the free end of the measuring tape and the free end of the elongate member.

7. The tape measure as claimed in claim 4 further including a recess in the housing, the elongate member being movably connected to the housing, and the elongate member being movable to a position in which the elongate member is disposed in the recess.

8. The tape measure as claimed in claim 1 further including a light source, the light source being positioned to illuminate the magnifying lens.

9. The tape measure as claimed in claim 1 wherein the housing has a generally plano-concave longitudinal profile.

10. The tape measure as claimed in claim 1 wherein the line is a cross-hair.

11. The tape measure as claimed in claim 1 wherein the line extends laterally beyond said one of the longitudinal edges of the measuring tape.

12. A tape measure comprising:
a housing having a tape outlet opening;
a flexible measuring tape being movable between a retracted position in which the measuring tape is substantially disposed within the housing, and an extended position in which at least a portion of the measuring tape extends through the tape outlet opening and extends linearly outside the housing, the measuring tape having a free end and a pair of longitudinal edges, and the measuring tape having measuring indicia displayed thereon;
a magnifying lens connected to the housing, the magnifying lens overlaying the portion of the measuring tape extending outside the housing when the measuring tape is in the extended position, and the magnifying lens extending laterally beyond one of the longitudinal edges of the measuring tape;
a line extending across the magnifying lens, the line being generally perpendicular to the longitudinal edges of the portion of the measuring tape extending outside the housing, the line being aligned with the measuring indicia; and
an elongate member connected to the housing, the elongate member having a free end remote from the housing;
wherein there is a known longitudinal distance between the line and the free end of the elongate member.

13. The tape measure as claimed in claim 12 wherein the magnifying lens has a periphery and a linear edge at the periphery thereof, the linear edge being perpendicular to the line.

14. The tape measure as claimed in claim 12 further including a recess in the housing the magnifying lens being movably connected to the housing, and the magnifying lens being movable to a position in which the magnifying lens is disposed in the recess.

15. The tape measure as claimed in claim 13 further including a recess in the housing, the elongate member being movably connected to the housing, and the elongate member being movable to a position in which the elongate member is disposed in the recess.

16. The tape measure as claimed in claim 12 further including a light source, the light source being positioned to illuminate the magnifying lens.

17. The tape measure as claimed in claim 12 wherein the housing has a generally plano-concave longitudinal profile.

18. The tape measure as claimed in claim 12 wherein the line is a cross-hair.

19. The tape measure as claimed in claim 12 wherein the line extends laterally beyond said one of the longitudinal edges of the measuring tape.

20. A tape measure comprising:
a housing having a tape outlet opening;
a flexible measuring tape movable between a retracted position in which the measuring tape is substantially disposed within the housing, and an extended position in which at least a portion of the measuring tape extends through the tape outlet opening and extends linearly outside the housing, the measuring tape having a free end and a pair of longitudinal edges, and the measuring tape having measuring indicia displayed thereon;
a magnifying lens connected to the housing, the magnifying lens overlaying the portion of the measuring tape extending outside the housing when the measuring tape is in the extended position, and the magnifying lens extending laterally beyond one of the longitudinal edges of the measuring tape;
a line extending across the magnifying lens, the line being generally perpendicular to the longitudinal edges of the portion of the measuring tape extending outside the housing, the line being aligned against the measuring indicia; and
an elongate member connected to the housing, the elongate member having a free end remote from the housing;
wherein the measuring indicia aligned with the line correspond to a longitudinal distance between the free end of the measuring tape and the free end of the elongate member.

21. The tape measure as claimed in claim 20 further including a light source, the light source being positioned to illuminate the magnifying lens.

22. The tape measure as claimed in claim 20 wherein the housing has a generally plano-concave longitudinal profile.

23. The tape measure as claimed in claim 20 wherein the line extends laterally beyond said one of the longitudinal edges of the measuring tape.

* * * * *